*INVENTOR.*
ROBERT W. PARSONS
PAUL R. CHANEY

United States Patent Office 3,437,139
Patented Apr. 8, 1969

3,437,139
PROCESS FOR IN SITU COMBUSTION IN SUBTERRANEAN SURFACE CONTAINING A PERMEABLE ZONE
Robert W. Parsons, Littleton, Colo., and Paul R. Chaney, Beaumont, Tex., assignors to Marathon Oil Company, Findlay, Ohio, a corporation of Ohio
Filed Jan. 17, 1967, Ser. No. 609,805
Int. Cl. E21b 43/20
U.S. Cl. 166—272       7 Claims

ABSTRACT OF THE DISCLOSURE

The present invention comprises a process for the recovery of petroleum from subterranean formations which formations comprise at least one petroleum-bearing zone and at least one permeable zone which is more permeable to gases than said petroleum-bearing zone, said formation having at least one production well and at least one injection well drilled therein said injection well passing through both of said zones; said process comprising combination of steps of: (a) injecting into said permeable zone at a point near said injection well a slug of a combustible liquid sufficiently large to substantially decrease the ability of said permeable zone to conduct gas from said injection well toward said production well, said slug being of sufficient quantity to sustain combustion for a substantial time, (b) igniting the petroleum in place in said petroleum-bearing zone and substantially simultaneously igniting said injected slug of combustible liquid, (c) injecting an oxygen containing fluid into said injection well to support combustion in both said zones whereby combustion of oil in said petroleum bearing zone drives petroleum toward said production well and wherein combustion of said slug of said combustible liquid in said permeable zone drives said slug toward said production well. Crude oil is obviously useful for a wide variety of purposes including starting material for the production of various organic compounds, manufacture of lubricating oils and gasolines, and coke and other carbon products.

SUMMARY OF THE INVENTION

The present invention relates to the field of recovery of petroleum from petroleum-bearing subterranean formations by in situ combustion methods. In particular, the present invention relates to methods for recovering such petroleum from formations which contain a petroleum-bearing zone and a permeable zone which is more highly permeable to the flow of air or other gases than is said petroleum-bearing zone. The invention embodies the discovery that by injecting into the more permeable zone a quantity of a combustible liquid preferably comprising a major portion of crude oil, the permeable zone may be substantially plugged and gas flow which would otherwise preferentially occur through this zone may be substantially decreased. It would, of course, be possible to inject sufficient combustible liquid to completely fill said permeable zone but this would, in most instances, be uneconomical. This invention utilizes the principal of igniting the slug of combustible liquid after it has been injected into the permeable zone so that a bank of combustible liquid moves through the permeable zone from the injection well toward the production well. By selecting the viscosity and combustibility of the combustible liquid carefully, the rate of movement of the flame front in the permeable zone may be synchronized with that in the petroleum-bearing zone. In most cases, it will be preferable to inject sufficient combustible liquid into the permeable zone to provide sufficient fuel for the driving of the bank of combustible liquid from the injection well at least most of the way toward the production well. Where the permeable zone has a higher permeability than the rock in the petroleum-bearing zone, the viscosity of the combustible liquid will be adjusted to be higher than of the crude petroleum in place. However, in many cases the permeability of the permeable zone will be sufficiently close to the permeability of the rock in the petroleum-bearing zone that crude oil of the general type to be recovered may be utilized as the combustible liquid.

DESCRIPTION OF THE PREFERRED EMBODIMENT

Figure 1:
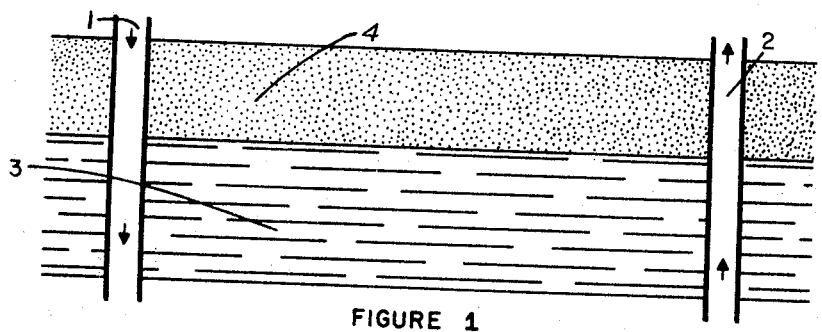
FIGURE 1 is a schematic diagram of the type of formation in which the present invention is practiced.

FIGURE 1 shows schematically a formation of the general type adaptable to the use of the present invention. An injection well 1 and a production well 2 have been drilled into the subterranean formations which include a petroleum-bearing zone 3 and a communicating permeable zone 4 which is in this particular case a gas zone.

Figure 2:
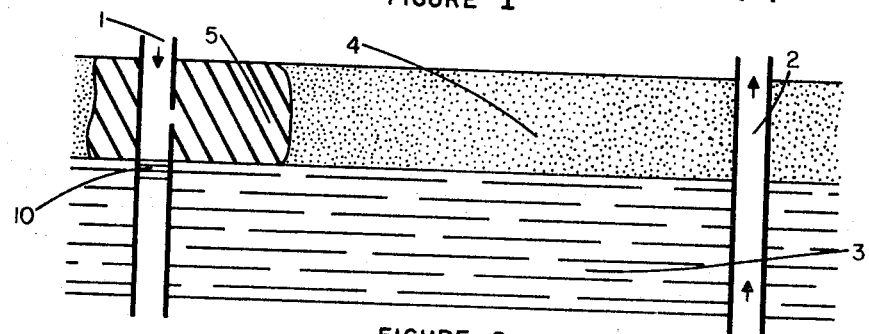
FIGURE 2 shows the formation of FIGURE 1 after injection of the combustible liquid.

As shown in FIGURE 2 a slug of combustible liquid in this case, the same general type of crude oil in place in the oil bearing zone 3 is injected through the injection well 1 into formation 4. For this purpose any casing can be perforated and a hydraulic packer 10 can be used to plug the injection well at a point just below the bottom of the porous zone 4. This packer can be removed after injection.

Figure 3:
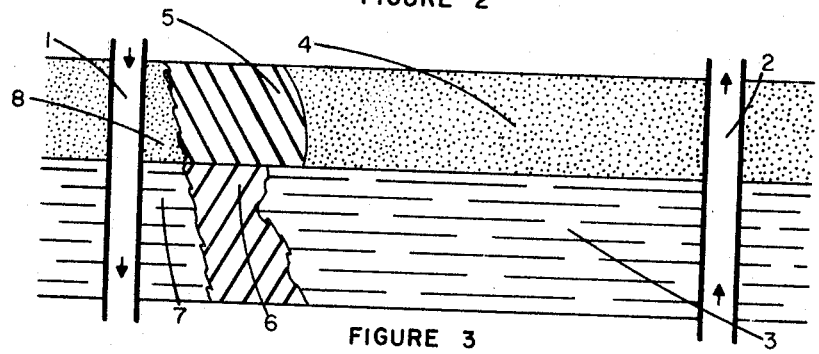
FIGURE 3 shows the formation of FIGURE 2 after ignition of the combustion front.

In FIGURE 3 the oil in place in zones 3 and 4 has been ignited forming a combustion front 7 in the petroleum-bearing zone and a similar combustion front 8 in the porous zone. Because the permeability of the rock in zones 3 and 4 is approximately equal in this case, the identical crude petroleum in place in zones 3 and 4 causes combustion front 7 to move toward the production well 2 at approximately the same rate as combustion front 8.

Figure 4:
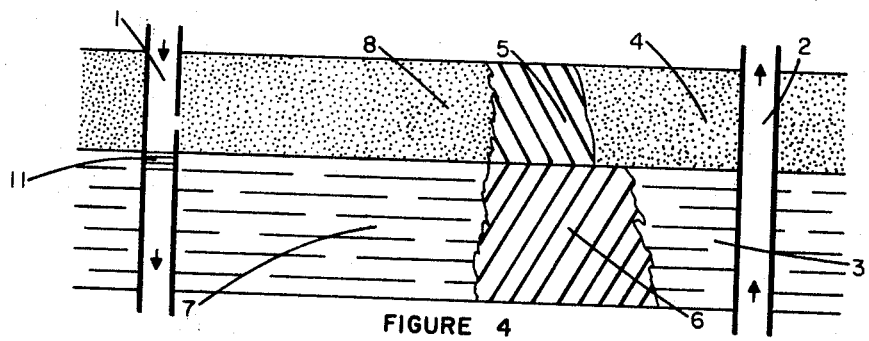
FIGURE 4 shows the formation after the in situ combustion petroleum recovery process has been underway for some time.

In FIGURE 4 the formation is shown sometimes after the time of ignition. It will be noted that the oil bank 6 in front of the combustion zone 7 of the petroleum-bearing zone 3 has substantially increased in size while the remaining slug of oil 5 which was injected into porous zone 4 has now diminished in size due to its being consumed as fuel to support the combusition zone 8.

During all phases of the above described in situ combustion recovery process the exhaust gases exit through the production well 2 as does the oil and any connate water or other water present in the formation. Air or other oxygen-containing gas is injected conventionally through the production well 1 in quantities sufficient to support the combusion at the desired rate. The slug 8 effectively blocks the flow of exhaust gases through the more permeable zone 4 thus conserving the pressure generated by the exhaust gases and providing force for driving the bank of recovered oil 6 toward the production well 2.

The above described process is adaptable to most of the generally recognized techniques of in situ combustion, e.g., those of U.S. 3,141,502 and related patents, use of oxygen enrichment in the air, use of specialized reignition procedure as necessary, simultaneous water-air injection in order to provide water to generate steam and further increase the driving power of the recovery process. These and other modifications will be apparent to persons skilled

What is claimed is:

1. A process for the recovery of petroleum from subterranean formations which formations comprise at least one petroleum-bearing zone and at least one permeable zone which is more permeable to gases than said petroleum-bearing zone, said formation having at least one production well and at least one injection well drilled therein, said injection well passing through both of said zones; said process comprising combination of steps of:

(a) injecting into said permeable zone at a point near said injection well a slug of a combustible liquid sufficiently large to substantially decrease the ability of said permeable zone to conduct gas from said injection well toward said production well, said slug being of sufficient quantity to sustain combustion for a substantial time, (b) igniting the petroleum in place in said petroleum-bearing zone to form a flamefront, (c) substantially simultaneously igniting said injected slug of combustible liquid, (d) injecting oxygen-containing fluid into said injection well to support combustion in both said zones, (e) continuing the combustion of oil in said petroleum-bearing zone so as to drive petroleum toward said production well, (f) continuing combustion of said of combustible liquid in said permeable zone to drive said slug toward said production well, and (g) controlling the combustion so that the combustible liquid moves through said permeable zone substantially equivalent to that of said flame-front moving through said petroleum-bearing zone.
in both said zones.

2. The process of claim 1 wherein the combustible liquid comprises a major portion of crude petroleum.

3. The process of claim 1 wherein the combustible liquid is injected through said injection well.

4. The process of claim 1 wherein said permeable zone consists essentially of a strata substantially above said petroleum-bearing zone and wherein said permeable zone is relatively shallow as compared to the depth of said petroleum-bearing zone.

5. The process of claim 4 wherein the oxygen-containing fluid is air.

6. The process of claim 1 wherein the oxygen-containing fluid is air.

7. The process of claim 1 wherein the oxygen-containing fluid is air.

References Cited

UNITED STATES PATENTS

| | | | |
|---|---|---|---|
| 2,793,697 | 5/1957 | Simm et al. | 166—39 |
| 3,126,957 | 3/1964 | McKinnell | 166—11 |
| 3,180,412 | 4/1965 | Bednarski et al. | 166—11 |
| 3,233,671 | 2/1966 | Chatenever | 166—11 |
| 3,294,164 | 12/1966 | Hardy et al. | 166—11 X |

STEPHEN J. NOVOSAD, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,437,139                          April 8, 1969

Robert W. Parsons et al.

It is certified that error appears in the above identified patent and that said Letters Patent are hereby corrected as shown below:

Column 2, line 4, after "than" insert -- that --; line 46 "sometimes" should read -- sometime --; line 52, "combusition" should read -- combustion --. Column 4, line 5, cancel "in both said zones".

Signed and sealed this 7th day of April 1970.

(SEAL)
Attest:

Edward M. Fletcher, Jr.                      WILLIAM E. SCHUYLER, JR

Attesting Officer                                Commissioner of Patents